United States Patent [19]
Sano et al.

[11] Patent Number: 4,760,120
[45] Date of Patent: Jul. 26, 1988

[54] EASILY SOLUBLE POLYETHYLENE POWDER FOR THE PREPARATION OF FIBERS OR FILMS HAVING HIGH STRENGTH AND HIGH ELASTIC MODULUS

[75] Inventors: Akira Sano, Kawasaki; Tetsujirou Kuroishi, Chiba; Yasunosuke Miyazaki, Machida; Shigeki Yokoyama, Yokohama; Kazuo Matsuura, Tokyo, all of Japan

[73] Assignee: Nippon Oil Company, Limited, Tokyo, Japan

[21] Appl. No.: 941,858

[22] Filed: Dec. 15, 1986

[30] Foreign Application Priority Data

Dec. 17, 1985 [JP] Japan .................................. 60-281856

[51] Int. Cl.$^4$ .......................... C08F 2/38; C08F 10/02
[52] U.S. Cl. ........................................ 526/82; 526/78; 526/87; 526/124; 526/125; 526/352; 526/904; 526/905; 525/242; 525/244; 525/245; 525/338; 525/339; 428/402
[58] Field of Search .................. 526/78, 82, 352, 905, 526/87, 904, 124, 125; 525/244, 245, 338, 339; 428/402

[56] References Cited

U.S. PATENT DOCUMENTS

| 3,592,880 | 7/1971 | Diedrich et al. | 526/78 X |
| 3,984,387 | 10/1976 | Liu et al. | 526/905 X |
| 4,014,859 | 3/1977 | Cooper et al. | 526/78 X |
| 4,311,752 | 1/1982 | Diedrich et al. | 526/905 X |
| 4,422,993 | 12/1983 | Smith et al. | 526/348.1 |
| 4,545,950 | 10/1985 | Motooka et al. | 526/348.1 |

FOREIGN PATENT DOCUMENTS

| 0135253 | 3/1985 | European Pat. Off. | 526/352 |
| 0186995 | 7/1986 | European Pat. Off. | 526/78 |
| 60-197752A | 3/1984 | Japan | 526/352 |
| 59-120605A | 7/1984 | Japan | 526/348.1 |
| 59-126446A | 7/1984 | Japan | 526/352 |
| 59-232123A | 12/1984 | Japan | 526/352 |
| 60-240748A | 11/1985 | Japan | 526/352 |

OTHER PUBLICATIONS

Schwartz, "Plastics Materials and Processes", Van Nostrand Rheinhold Co. Inc., N.Y., (1982), pp. 74–75.

Primary Examiner—Joseph L. Schofer
Assistant Examiner—F. M. Teskin
Attorney, Agent, or Firm—Dilworth & Barrese

[57] ABSTRACT

An ultra-high molecular weight polyethylene powder easily soluble in organic solvents and suitable for use in the preparation of fibers or films having a high strength and a high elastic modulus, said polyethylene powder having an intrinsic viscosity in the range of 5 to 30 dl/g in decalin at 135° C. and being obtained by at least two-step polymerization reactions which are:

a first step of polymerizing ethylene in the absence of hydrogen or at a reduced hydrogen concentration, using a catalyst containing a solid catalyst component and an organometallic compound, said solid catalyst component containing at least magnesium and titanium and/or vanadium, to produce 50–99.5 parts by weight, based on 100 parts by weight of a final polyethylene product, of polyethylene having an intrinsic viscosity of 12 to 32 dl/g in decalin at 135° C.; and a second step of polymerizing ethylene at a higher hydrogen concentration that in said first step to produce 50–0.5 parts by weight of polyethylene.

4 Claims, No Drawings

EASILY SOLUBLE POLYETHYLENE POWDER FOR THE PREPARATION OF FIBERS OR FILMS HAVING HIGH STRENGTH AND HIGH ELASTIC MODULUS

BACKGROUND OF THE INVENTION

The present invention relates to an ultra-high molecular weight polyethylene powder as a starting material for the preparation of polyethylene fibers or films having a high strength and a high elastic modulus. More particularly, it is concerned with an ultra-high molecular weight polyethylene powder superior in solubility to organic solvents, obtained by combining a specific catalyst with a specific polymerization process.

So-called ultra-high molecular weight polyethylenes extremely high in molecular weight, which is above one million, have been used as characteristic engineering plastics superior in impact resistance and abrasion resistance and having a self-lubricating property, in a wide variety of fields such as food machinery, construction machinery, chemical machinery, agriculture, mining industry, sports and leisure industry, including hoppers, silos, various gears, lining materials and ski linings.

Ultra-high molecular weight polyethylenes are much higher in molecular weight than general-purpose polyethylenes, so it is possible that there will be obtained a drawn product having unprecedentedly high strength and high elastic modulus provided a high orientation can be attained. From this point of view, various studies have been made for attaining a high orientation of ultra-high molecular weight polyethylenes. However, as compared with general-purpose polyethylenes, ultra-high molecular weight polyethylenes are extremely high in melt viscosity and so can hardly be subjected to extrusion in a conventional manner and it has been impossible to draw them into a highly oriented state.

In Japanese Patent Laid Open No.15408/81 there is disclosed a process in which a gel obtained from a solution (dope) of an ultra-high molecular weight polyethylene in decalin is drawn at a high draw ratio to prepare a fiber having a high strength and a high elastic modulus. However, the polymer concentrations in the dope adopted therein are extremely low, which are 3 wt.% and 1 wt.% in the cases of weight average molecular weights of $1.5 \times 10^6$ and $4 \times 10^6$, respectively. For practical use, a dope of a higher concentration is desired in view of problems such as the disposal of a large amount of solvent and economy.

The preparation of a polyethylene solution involves no special problem in the case where an average molecular weight of the polymer is about several hundred thousand or less. It can be effected easily by heating and agitating the dope at an appropriate temperature using a suitable solvent. But ultra-high molecular weight polyethylenes above one million in average molecular weight are extremely high in viscosity even in a solvated state. Even if the polymer particles are solvated and swollen at surface portions thereof, the particle surfaces are covered with the solvate to prevent permeation of solvent to the interior Further, there occurs fusion bonding between particles, which impedes a homogeneous dissolution.

For overcoming the above-mentioned difficulty of dissolution of ultra-high molecular weight polyethylenes and thereby preparing a higher concentration solution, there has been proposed, for example, a supersonic wave radiating method or a concentrating method from a dilute solution. However, both methods involve the likelihood of the molecular chain being cut and are therefore not preferable when it is intended to develop intrinsic properties of ultra-high molecular weight polyethylenes through a subsequent forming step.

Thus, it is by no means easy to dissolve an ultra-high molecular weight polyethylene in a solvent to prepare a homogeneous forming dope. This has been a serious obstacle to an industrial application of the conventional method.

SUMMARY OF THE INVENTION

It is the object of the present invention to solve the above problems encountered in the prior art and provide an ultra-high molecular weight polyethylene powder superior in solubility to organic solvents.

More specifically, the present invention resides in an ultra-high molecular weight polyethylene powder easily soluble in organic solvents and suitable for use in the preparation of fibers or films having a high strength and a high elastic modulus, the polyethylene powder having an intrinsic viscosity of 5-30 dl/g in decalin at 135° C. and being obtained by at least two-step polymerization reactions which are:

a first step of polymerizing ethylene in the absence of hydrogen or at a reduced hydrogen concentration, using a catalyst comprising a solid catalyst component and an organometallic compound, the solid catalyst component containing at least magnesium and titanium and/or vanadium, to produce 50-99.5 parts by weight, based on 100 parts by weight of a final polyethylene product, of polyethylene having an intrinsic viscosity of 12-32 dl/g in decalin at 135° C.; and a second step of polymerizing ethylene at a higher hydrogen concentration than in the first step to produce 50-0.5 parts by weight of polyethylene.

The ultra-high molecular weight polyethylene powder obtained in accordance with the present invention has the following effects (features).

(1) Because of easy dissolution in various organic solvents, it is possible to prepare fibers or films of a high strength and a high elastic modulus in an extremely stable manner.

(2) Because of easy dissolution in various organic solvents, it is possible to obtain a high concentration solution, thus permitting an extremely economical preparation of fibers and films.

DETAILED DESCRIPTION OF THE INVENTION

A more concrete description will be given below about how to prepare the ultra-high molecular weight polyethylene powder of the present invention.

In the first step, ethylene is polymerized in a solvent or in vapor phase at a hydrogen concentration of 0 to about 10 mole% to prepare 50-99.5, preferably 70-99, parts by weight of polyethylene having an intrinsic viscosity of 12-32 dl/g in decalin at 135° C. In this case, there is used a polymerization catalyst (details will be described later) comprising a solid catalyst component and an organometallic compound, the solid catalyst component containing at least magnesium and titanium and/or vanadium. The polymerization is conducted at a pressure of 0 to 70 kg/cm$^2$·G and at a temperature of 0° to 90° C., preferably 20° to 80° C. As the polymerization solvent there is used an organic solvent inert to Ziegler type catalysts. Examples are saturated hydrocarbons such as butane, pentane, hexane, heptane, octane and cyclohexane, and aromatic hydrocarbons such as benzene, toluene and xylene, as well as high boiling organic solvents if required in the forming of the resulting ultra-high molecular weight polyethylene, such as decalin, tetralin, decane and kerosene.

Then, in the second step, ethylene is polymerized at a hydrogen concentration of 35 to 95 mole% to prepare 50–0.5, preferably 30–1, parts by weight of polyethylene. The polymerization pressure is in the range of 0 to 70 kg/cm$^2$·G and temperature in the range of 40° to 100° C., preferably 60° to 90° C. The catalyst may be added if necessary. The intrinsic viscosity of the polyethylene produced in the second step is in the range of about 0.1 to 4.9 dl/g (in decalin at 135° C.).

Using an α-olefin other than ethylene as a comonomer to effect copolymerization is not desirable because it is apt to cause a lowering in molecular weight of the resulting polymer, but an α-olefin in an amount as small as 0.1 to 5 mole% may be used in the second step polymerization. Examples of such α-olefin are those used in conventional processes for the copolymerization of ethylene using Ziegler type catalysts, such as propylene, 1-butene, 4-methyl-1-pentene, 1-hexene and 1-octene.

Further, as third and subsequent steps, there may be added higher or lower molecular weight components if necessary.

The catalyst used in preparing the ultra-high molecular weight polyethylene powder of the present invention comprises a solid catalyst component containing at least magnesium and titanium and/or vanadium, and an organometallic compound typified by an organoaluminum compound.

Preferably, the solid catalyst component is obtained by supporting in a known manner a titanium compound and/or a vanadium compound on an inorganic solid compound containing magnesium.

Examples of the inorganic solid compound containing magnesium are metal magnesium, magnesium hydroxide, magnesium carbonate, magnesium oxide, magnesium chloride, as well as double salts, double oxides, carbonates, chlorides and hydroxides each containing a metal selected from silicon, aluminum and calcium and also containing magnesium atom; further, products obtained by treating or reacting those inorganic solid compounds with organic oxygen-containing compounds such as water, alcohols, phenols, ketones, aldehydes, carboxylic acids, esters, polysiloxanes and acid amides; inorganic oxygen-containing compounds such as metal alkoxides and metal salts of hydroxy acid; organic sulfur-containing copounds such as thiols and thioethers; inorganic sulfur-containing compounds such as sulfur dioxide and sulfur trioxide, in addition to sulfur; mono- and polycyclic aromatic hydrocarbons such as benzene, toluene, xylene, anthracene and phenanthrene; or halogen-containing compounds such as hydrogen chloride, metal chlorides and organic halides, in addition to chlorine.

Examples of the titanium compound to be supported on the inorganic solid compound are halides, alkoxyhalides, alkoxides and halogenated oxides, of titanium. Tetravalent and trivalent titanium compounds are preferred.

As tetravalent titanium compounds, those represented by the general formula $$Ti(OR)_nX_{4-n}$$

are preferred wherein R is an alkyl, aryl or aralkyl group having 1 to 20 carbon atoms, X is a halogen atom and n is $0 \leq n \leq 4$. Examples are titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, and tetraphenoxytitanium.

As examples of trivalent titanium compounds are mentioned those obtained by reducing titanium tetrahalides such as titanium tetrachloride and titanium tetrabromide with hydrogen, aluminum, titanium, or organometallic compounds of metals of Groups I through III in the Periodic Table, as well as those obtained by reducing tetravalent alkoxytitanium halides of the general formula $$Ti(OR)_mX_{4-m}$$

wherein R is an alkyl, aryl or aralkyl group having 1 to 20 carbon atoms, X is a halogen atom and m is $0 < m < 4$, with organometallic compounds of metals of Groups I through III in the Periodic Table.

Tetravalent titanium compounds are particularly preferred.

As examples of the vanadium compound are mentioned tetravalent vanadium compounds such as vanadium tetrachloride, pentavalent vanadium compounds such as vanadium oxytrichloride and orthoalkyl vanadate, and trivalent vanadium compounds such as vanadium trichloride.

As concrete examples of the solid catalyst component are mentioned those exemplified in Japanese Patent Publication Nos. 3514/76, 23864/75, 152/76, 77, 11710/77 and 153/76, as well as Japanese Patent Laid Open Nos. 106581/74 and 95909/81.

As other examples of the solid catalyst component are mentioned reaction products of Grignard compounds and titanium compounds, such as those concretely described in Japanese Patent Publication Nos.39470/75, 79 and 12954/79 as well as Japanese Patent Laid Open No. 79009/82. Also employable are solid catalyst components obtained by using inorganic oxides together with organic carboxylic acid esters as optional components, such as those described in Japanese Patent Laid Open Nos. 47407/81, 187305/82 and 21405/83.

As preferred examples of the organoaluminum compound used in the present invention are mentioned those represented by the general formulae $$R_3Al, R_2AlX, RAlX_2, R_2AlOR, RAl(OR)X \text{ and } R_3Al_2X_3$$

wherein R, which may be the same or different, is an alkyl, aryl or aralkyl group having 1 to 20 carbon atoms and X is a halogen atom, such as triethylaluminum, triisobutylaluminum, trihexylaluminum, trioctylaluminum, diethylaluminum chloride, diethylaluminum ethoxide, ethylaluminum sesquichloride, and mixtures thereof. The amount of the organoaluminum compound to be used is not specially limited, but usually it is in the range of 0.1 to 1000 moles per mole of the titanium compound.

The ultra-high molecular weight polyethylene powder of the present invention is prepared using the catalyst system exemplified above.

Contacting the catalyst system with an α-olefin before the polymerization reaction will greatly improve the polymerization activity and permit the polymerization reaction to be carried out more stably than in the case where such contact treatment is not performed. As conditions for this pretreatment, the time and temperature of the contact between the catalyst system and α-olefin are not specially limited. For example, 1 g to 50,000 g, preferably 5 g to 30,000 g, per gram of the solid catalyst component, may be contacted with the catalyst system at a temperature of 0° to 200° C., preferably 0° to 110° C., for 1 minute to 24 hours. Preferred examples of the α-olefin are those previously exemplified.

The reason why the ultra-high molecular weight polyethylene powder easily soluble in organic solvents is obtained by the specific process of the present invention, is not clear. It is presumed that the polymer particles obtained according to the polymerization process of the present invention have a multiple structure, and the interior thereof is occupied by a low molecular weight polymer component. And it is presumed that if the said particles are placed under dissolving conditions in an organic solvent (usually 130°–180° C.), the interior polymer will dissolve and act as a good solvent, thereby improving the solubility. Therefore, in order to achieve the object of the present invention, it is an essential condition to first produce an ultra-high molecular weight polyethylene and then produce a lower molecular weight polyethylene. If this order is reversed, the effect of the present invention will not be attained.

As the solvent for preparing a solution of the ultra-high molecular weight polyethylene powder of the present invention in the formation thereof into a fiber or a film, various organic solvents are employable, including aromatic compounds such as toluene, xylene, methyldiphenylmethane, naphthalene, o-dichlorobenzene and trichlorobenzene, as well as decalin, tetralin, isoparaffin, paraffin wax, kerosene and terpene.

As the vessel for use in preparing a solution of the ultra-high molecular weight polyethylene, it may be a conventional closed type heating vessel provided with an agitator, or it may be a mixing machine involving both rotation and revolution and having a shear force not so strong. As the dissolution temperature, there may be used any temperature up to the boiling point of the solvent used, preferably a temperature in the range from the melting temperature of polyethylene up to the boiling point of the solvent used.

The polymer concentration in the solution capable of being prepared according to the present invention depends on the molecular weight in the first step and that in the second step as well as the production ratio in the first and second steps. But when viewed from the primary object of using the dope in forming, it is not the purport to prepare an extremely high concentration solution. Actually, the formability of the dope and the performance of the resulting fiber or film must be taken into account. In view of these points, an appropriate concentration range of the ultra-high molecular weight polyethylene powder is up to about 30 wt.%.

Fibers can be prepared from the above ultra-high molecular weight polyethylene solution by discharging the solution in a fibrous form using conventional gear pump and spinning nozzle, followed by cooling to solidification to obtain a gelled product, and then drawing the gelled product at a desired draw ratio through a pair of godet rolls in a heated tubular oven.

For making films, conventional film forming means, e.g. T-die process, can be adopted.

According to the present invention it becomes possible to obtain a homogeneous ultra-high molecular weight polyethylene solution of a high concentration without using any special apparatus and method for dissolution, whereby a stable and economical preparation of fibers or films having a high strength and a high elastic modulus can be effected.

It is well known that the formability of resin is improved by widening the molecular weight distribution of the resin through multi-stage polymerization for example. In the case of polyethylene, such improvement is attainable in a region up to several hundred thousand in terms of an average molecular weight. In the field of ultra-high molecular weight polyethylenes as in the present invention, although a slight improvement is made in formability, the resulting formed article is markedly deteriorated in its physical properties (attributable to a low molecular weight component), resulting in impairment of intrinsic features of ultra-high molecular weight polyethylenes.

The reason why in the case of using the ultra-high molecular weight polyethylene powder of the present invention as the starting material the high strength and high elastic modulus inherent in ultra-high molecular weight polyethylenes are developed despite the presence of low molecular weight component, is not clear. But this is presumed to be because the dissolution and dispersion of the polymers produced in the first and second steps are effected more uniformly in the dope due to the improved solubility mentioned above.

The following examples are given to illustrate the present invention concretely in more detail, but it is to be understood that the invention is not limited thereto.

EXAMPLE 1

(a) Preparation of Solid Catalyst Component 10 g of a commercially available anhydrous magnesium chloride and 1.7 g of aluminum triethoxide were placed in a stainless steel pot having an internal volume of 400 ml and containing 25 stainless steel balls each ½ inch in diameter, and ball milling was performed for 5 hours at room temperature in a nitrogen atmosphere. Thereafter, 2.2 g of titanium tetrachloride was added and ball milling was further conducted for 16 hours to obtain a solid catalyst component containing 39 mg of titanium per gram thereof.

(b) Polymerization

A 2 l stainless steel autoclave equipped with an induction stirrer was purged with nitrogen and 1,000 ml of hexane was charged into the autoclave. Then, 1 mmol of triethylaluminum and 10 mg of the solid catalyst component prepared above were added and the temperature was raised to 60° C. under stirring. The system was pressurized to 1.5 kg cm$^2$·G by the vapor pressure of hexane. Ethylene was introduced up to a total pressure of 10 kg/cm$^2$·G and polymerization was allowed to take place. The introduction of ethylene was continued from a 5 l ethylene measuring vessel to maintain the total pressure in the autoclave at 10 kg/cm$^2$·G. The polymerization was continued until the pressure of the measuring vessel dropped by 7 kg/cm$^2$ (first step).

The polymer obtained was found to have an intrinsic viscosity [$\eta$] of 18.9 dl/g.

Thereafter, the ethylene in the system was purged quickly and hydrogen was introduced up to a total pressure of 7 kg/cm$^2$·G and then ethylene introduced up to a total pressure of 10 kg/cm$^2$·G. In this condition, polymerization was started again at 60° C. Ethylene was introduced continuously to maintain the total pressure at 10 kg/cm$^2$·G and the polymerization was continued until the pressure of the measuring vessel dropped by 3 kg/cm$^2$ (second step).

Thereafter, the polymer slurry was transferred into a beaker and the hexane removed under reduced pressure, leaving 62 g of white polyethylene. The amount of the polymer produced in the first step and that in the second step were 70 and 30 parts by weight, respectively, and the intrinsic viscosity [$\eta$] of the entire polymer was 11.7 dl/g (indecalin at 135° C.).

(c) Solubility and Spinning Test

Decalin containing a small amount of an antioxidant was added to the polymer thus obtained allowing the polymer to be dissolved at 140° C. for 3 hours under stirring, to obtain a 10 wt.% of an ultra-high molecular weight polyethylene solution. This solution was free from undissolved matter of agglomerate and the vessel was also free from any deposit on its side and bottom portions.

Then, the solution was subjected to spinning at 130° C. using a spinning die having a spinneret diameter of 1.0 mm, to obtain a gelled fiber containing the solvent. There was neither breakage nor unevenness of yarn, and thus the solution proved to be a homogeneous spinning solution. Then, the fiber was drawn by passing in a cylindrical oven heated at 120° C. at a draw ratio of 30X. Elastic modulus and strength are shown in Table 1.

COMPARATIVE EXAMPLE 1

A 2-liter stainless steel autoclave equipped with an induction stirrer was purged with nitrogen and 1,000 ml of hexane was charged into the autoclave. Then, 1 mmol of triethylaluminum and 10 mg of the solid catalyst component obtained in Example 1-(a) were added and the temperature was raised to 60° C. under stirring. The system was pressurized to 1.5 kg cm$^2$·l G by the vapor pressure of hexane. Ethylene was introduced up to a total pressure of 10 kg/cm$^2$·G and polymerization was continued for 20 minutes while introducing ethylene continuously to maintain the total pressure at 10 kg/cm$^2$·G, to afford 72 g of a white polyethylene having an intrinsic viscosity [$\eta$] of 18.5 dl/g.

Using this polymer, a 10 wt.% decalin solution was prepared in accordance with Example 1-(c), but it was not homogeneous, with a large gelled matter present therein.

Using the solution prepared above, a spinning test was performed, but the breaking of yarn occurred frequently and it was impossible to effect spinning.

COMPARATIVE EXAMPLE 2

Using the polymer obtained in Comparative Example 1, a 5 wt.% solution was prepared in accordance with Example 1-(c), and a spinning test was performed. But spinning was unstable and unevenness of yarn occurred, and there were obtained only low values of elastic modulus and strength as shown in Table 1.

COMPARATIVE EXAMPLE 3

Using the polymer obtained in Comparative Example 1, there was prepared a dilute 1 wt.% solution in accordance with Example 1-(c), and a spinning test was conducted. Spinning could be done stably. Values of elastic modulus and strength obtained are as set out in Table 1.

EXAMPLE 2

Polymerization was carried out in the same way as in Example 1-(b) except that the value of the drop in pressure of the ethylene measuring vessel in the first step polymerization and that in the second step polymerization were changed to 9.0 kg/cm$^2$ and 1.0 kg/cm$^2$, respectively, to afford 63 g of a white polyethylene. The amount of polymer produced in the first step and that in the second step were 90 and 10 parts by weight, respectively, and the intrinsic viscosity [$\eta$] of the entire polymer was 15.1 dl/g.

Using this polymer, a 5 wt.% solution in decalin was prepared in accordance with Example 1-(c), and a spinning test was conducted. Spinning could be done stably. Values of elastic modulus and strength obtained are as shown in Table 1.

EXAMPLE 3

Polymerization was carried out in the same way as in Example 1-(b) except that the value of the drop in pressure of the ethylene measuring vessel in the first step polymerization and that in the second step polymerization were changed to 8.0 and 2.0 kg/cm$^2$, respectively, to afford 62 g of a white polyethylene. The amount of polymer produced in the first step and that in the second step were 80 and 20 parts by weight, respectively, and the intrinsic viscosity [$\eta$] of the entire polymer was 13.0 dl/g.

Using this polymer, a 7 wt.% solution in decalin was prepared in accordance with Example 1-(c), and a spinning test was performed. Spinning could be done stably. Values of elastic modulus and strength obtained are as shown in Table 1.

EXAMPLE 4

(a) Preparation of Solid Catalyst Component

In the same way as in Example 1-(a) except that 2.2 g of aluminum triethoxide and 3.2 g of silicon tetraethoxide were used in place of 1.7 g of aluminum triethoxide, there was prepared a solid catalyst component containing 32 mg of titanium per gram thereof.

(b) Polymerization 1,000 ml of hexane was charged into the same autoclave as that used in Example 1-(b), then 2 mmol of diethyl aluminum chloride and 10 mg of the solid catalyst component prepared above were added, and the temperature was raised to 40° C. under stirring. The system was pressurized to 1.3 kg/cm$^2$·G by the vapor pressure of hexane. Ethylene was introduced up to a total pressure of 10 kg/cm$^2$·G and polymerization of allowed to take place. The introduction of ethylene was continued from a 5 l ethylene measuring vessel to maintain the total pressure in the autoclave at 10 kg cm$^2$·G. The polymerization was continued until the pressure of the measuring vessel dropped by 7 kg/cm$^2$ (first step).

The polymer obtained was found to have an intrinsic viscosity [η], of 26.1 dl/g.

Thereafter, the ethylene in the system was purged quickly and the temperature was raised up to 80° C. Hydrogen was introduced up to a total pressure of 8 kg/cm²·G and then ethylene introduced up to a total pressure of 10 kg/cm²·G. In this condition, polymerization was started again. Ethylene was introduced continuously to maintain the total pressure at 10 kg/cm²·G and the polymerization was continued until the pressure of the measuring vessel dropped by 3 kg/cm² (second step).

Thereafter, the polymer slurry was transferred into a beaker and the hexane removed under reduced pressure, leaving 62 g of a white polyethylene. The amount of polymer produced in the first step and that of polymer in the second step were 70 and 30 parts by weight, respectively, and the intrinsic viscosity [η] of the entire polymer was 16.0 dl/g.

Using this polymer, a 5 wt.% solution in decalin was prepared in accordance with Example 1-(c), and a spinning test was performed. Spinning could be done stably. Values of elastic modulus and strength are as shown in Table 1.

EXAMPLE 5

Polymerization was carried out in the same way as in Example 4-(b) except that the value of the drop in pressure of the ethylene measuring vessel in the first step polymerization and that in the second step polymerization were changed to 6.0 and 4.0 kg/cm², respectively, to afford 63 g of a white polyethylene. The amount of polymer produced in the first step and that in the second step were 60 and 40 parts by weight, respectively, and the intrinsic viscosity [η] of the entire polymer was 12.2 dl/g.

Using this polymer, a 10 wt.% solution in decalin was prepared in accordance with Example 1-(c), and a spinning test was conducted. Spinning could be done stably. Values of elastic modulus and strength are as shown in Table 1.

EXAMPLE 6

(a) Preparation of Solid Catalyst Component

In the same way as in Example 1-(a) except that both 0.5 g of VO(OC₂H₅)₃ and 2.0 g of titanium tetrachloride were used in place of 2.0 g titanium tetrachloride alone, there was prepared a solid catalyst component containing 7.6 mg vanadium and 30.6 mg titanium per gram thereof.

(b) Polymerization 1,000 ml of hexane was charged into the same autoclave as that used in Example 1-(b), then 1 mmol of triethylaluminum and 10 mg of the solid catalyst component prepared above were added, and the temperature was raised to 60° C. under stirring. The system was pressurized to 1.5 kg/cm²·G by the vapor pressure of hexane. Ethylene was introduced up to a total pressure of 10 kg/cm²·G and polymerization was allowed to take place. The introduction of ethylene was continued from a 5 l ethylene measuring vessel to maintain the total pressure of the autoclave at 10 kg/cm²·G and the polymerization was continued until the pressure of the measuring vessel dropped by 7 kg/cm² (first step).

The polymer obtained was found to have an intrinsic viscosity [η] of 20.5 dl/g.

Thereafter, the ethylene in the system was purged quickly and hydrogen was introduced up to a total pressure of 7 kg/cm²·G, then ethylene was introduced up to a total pressure of 10 kg/cm²·G and polymerization was started again. The introduction of ethylene was continued to maintain the total pressure at 10 kg/cm²·G and the polymerization was continued until the pressure of the measuring vessel dropped by 3 kg/cm² (second step).

Thereafter, the polymer slurry was transferred into a beaker and the hexane removed under reduced pressure, leaving 60 g of a white polyethylene.

The amount of polymer produced in the first step and that in the second step were 70 and 30 parts by weight, respectively, and the intrinsic viscosity [η] of the entire polymer was 13.8 dl/g.

Using this polymer, a 10 wt. % solution in decalin was prepared in accordance with Example 1-(c), and a pinning test was performed. Spinning could be done stably. Values of elastic modulus and strength are as shown in Table 1.

TABLE 1

|  | Polymer Concentration in Decalin Solution (wt %) | Elastic Modulus (g/d) | Strength (g/d) |
|---|---|---|---|
| Example 1 | 10 | 989 | 30.1 |
| Example 2 | 5 | 1120 | 33.4 |
| Example 3 | 7 | 1065 | 32.2 |
| Example 4 | 5 | 1280 | 40.7 |
| Example 5 | 10 | 1181 | 36.5 |
| Example 6 | 10 | 1005 | 31.0 |
| Comparative Example 1 | 10 | cannot be measured | cannot be measured |
| Comparative Example 2 | 5 | 201 | 14.6 |
| Comparative Example 3 | 1 | 1010 | 30.0 |

Draw ratio: 30X

What is claimed is:

1. An ultra-high molecular weight polyethylene powder, said polyethylene powder having an intrinsic viscosity in the range of 12.2 to 30 dl/g in decalin at 135° C. and being obtained by at least a polymerization reaction comprising at least the following two-steps:

a first step of polymerizing ethylene at a hydrogen concentration of 0 to about 10 mole %, using a catalyst conaining a solid catalyst component and an organometallic compound, said solid catalyst component containing at least magnesium and titanium and/or vanadium, to produce 70–99 parts by weight, based on 100 parts by weight of a final polyethylene product, of polyethylene having an intrinsic viscosity of 12 to 32 dl/g in decalin at 135° C.; and a second step of polymerizing ethylene at a hydrogen concentration of 35 to 90 mole % to produce 30–1 parts by weight of polyethylene.

2. The polyethylene powder of claim 1, wherein said solid catalyst component comprises a magnesium-containing inorganic solid carrier and a titanium compound and/or a vanadium compound supported on said inorganic solid carrier, and wherein said organometallic compound is an organoaluminum compound.

3. The polyethylene powder of claim 1, wherein the polymerization pressure and temperature in the first step are in the ranges of 0 to 70 kg/cm²·G and 0° to 90° C., respectively, and the polymerization pressure and temperature in the second step are in the ranges of 0 to 70 kg/cm²·G and 40° to 100° C., respectively.

4. The polyethylene powder of claim 1, wherein polyethylene produced in the second step has an intrinsic viscosity in the range of about 0.1 to 4.9 dl/g in decalin at 135° C.

* * * * *

UNITED STATES PATENT AND TRADEMARK OFFICE
CERTIFICATE OF CORRECTION

PATENT NO. : 4,760,120

DATED : July 26, 1988

INVENTOR(S) : Sano et al.

It is certified that error appears in the above-identified patent and that said Letters Patent is hereby corrected as shown below:

Column 4, Line 49, after 39470/75 delete "79" and insert therefor --12953/79--;

Column 10, Line 14, "pinning" should read --spinning--;

Column 10, Line 42, "conaining" should read --containing--.

Signed and Sealed this

Twenty-ninth Day of November, 1988

Attest:

DONALD J. QUIGG

*Attesting Officer*     *Commissioner of Patents and Trademarks*